Aug. 25, 1931.     J. P. TARBOX     1,820,099
VEHICLE BODY
Original Filed Sept. 1, 1927     3 Sheets-Sheet 1

INVENTOR.
John P. Tarbox

Aug. 25, 1931.  J. P. TARBOX  1,820,099
VEHICLE BODY
Original Filed Sept. 1, 1927  3 Sheets-Sheet 2

FIG. 6ª

INVENTOR.
John P. Tarbox

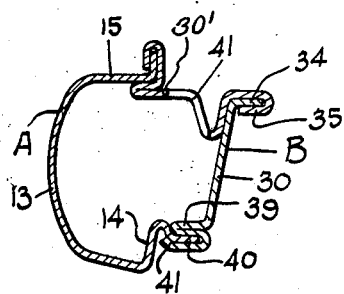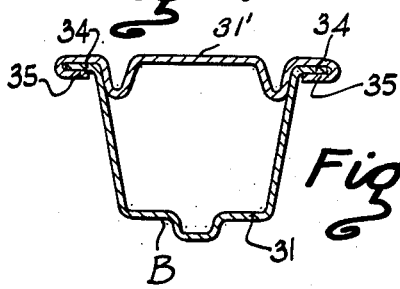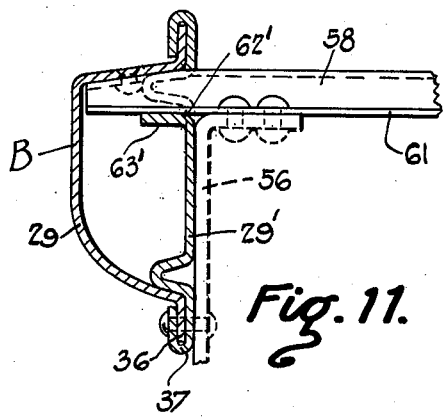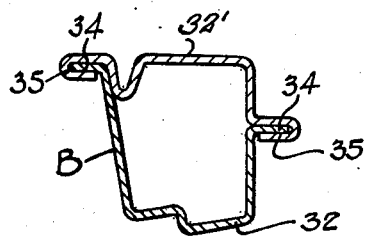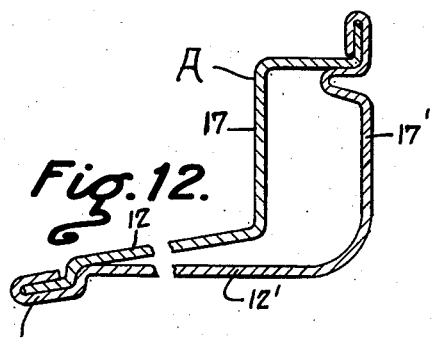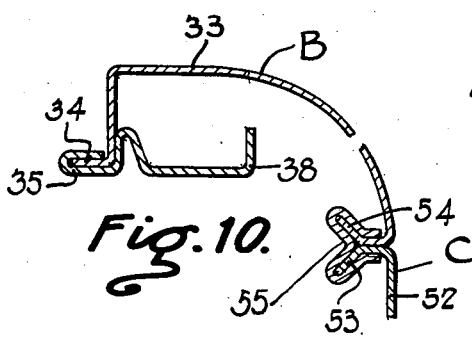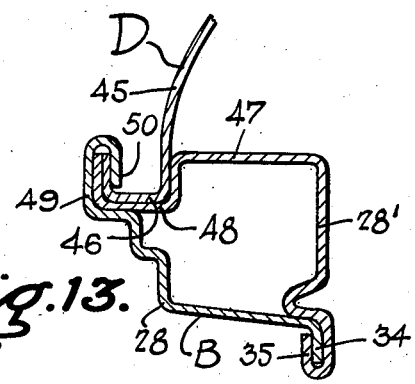

Patented Aug. 25, 1931

1,820,099

UNITED STATES PATENT OFFICE

JOHN P. TARBOX, OF PHILADELPHIA, PENNSYLVANIA, ASSIGNOR TO EDWARD G. BUDD MFG. COMPANY, OF PHILADELPHIA, PENNSYLVANIA, A CORPORATION OF PENNSYLVANIA

VEHICLE BODY

Application filed September 1, 1927, Serial No. 216,906. Renewed February 12, 1931.

My invention relates to vehicle bodies, and more particularly to such bodies made up in large part of inner and outer panels joined together to form both the framework and shell of the body.

It is an object of my invention to provide an improved body of this class constructed in sub-assembly units which are well adapted to be joined substantially throughout by crimping operations, thereby enabling the body to be assembled, in large part, very economically in large crimping dies, adapted to receive the various sub-assembly units and the sub-assembly units in the final assembly. I accomplish this object by a proper choice of the lines of division into units and by a formation of the adjoining parts connecting the units in a manner to facilitate their joinder.

It is a further object of my invention to decrease the number of parts by combining in one element functions heretofore performed by separate elements, and to make a very rigid body unit capable of having mounted thereon prior to assembly with the underframe or chassis certain of the seat and floor structures.

It is an object of my invention further to so distribute the cross brace functions of body and chassis as to permit the weight of body seats and floor boards to be wholly borne by the chassis and to make it unnecessary to provide in both chassis and body more cross connections than are ordinarily employed in the chassis alone, where no cross braces are provided in the body superstructure proper. I accomplish this latter object by so distributing and connecting the cross braces of body and chassis that the cross braces of the body rest upon the sills of the chassis and are secured thereto in the final assembly to serve also as chassis sills, and the chassis sills interpersed with the body sills to serve likewise as combined body and chassis sills.

Further objects and advantages and the manner in which they are attained will become apparent from the following detailed description taken in connection with the drawing in which, Fig. 1 represents more or less diagrammatically and in a perspective view, a sedan type of body superstructure embodying my invention.

Figure 5:
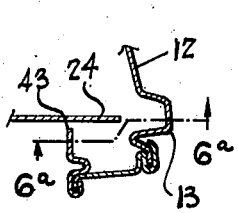
Figure 6:
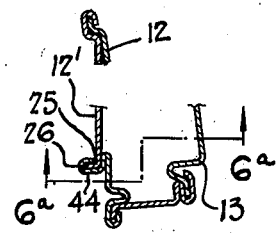

Figs. 5 and 6 are detail sectional views taken respectively on the lines 5—5 and 6—6 of Fig. 6a.

Fig. 6a is a sectional view of the front construction taken respectively substantially on the lines marked 6a—6a of Figs. 5 and 6.

Figure 1:
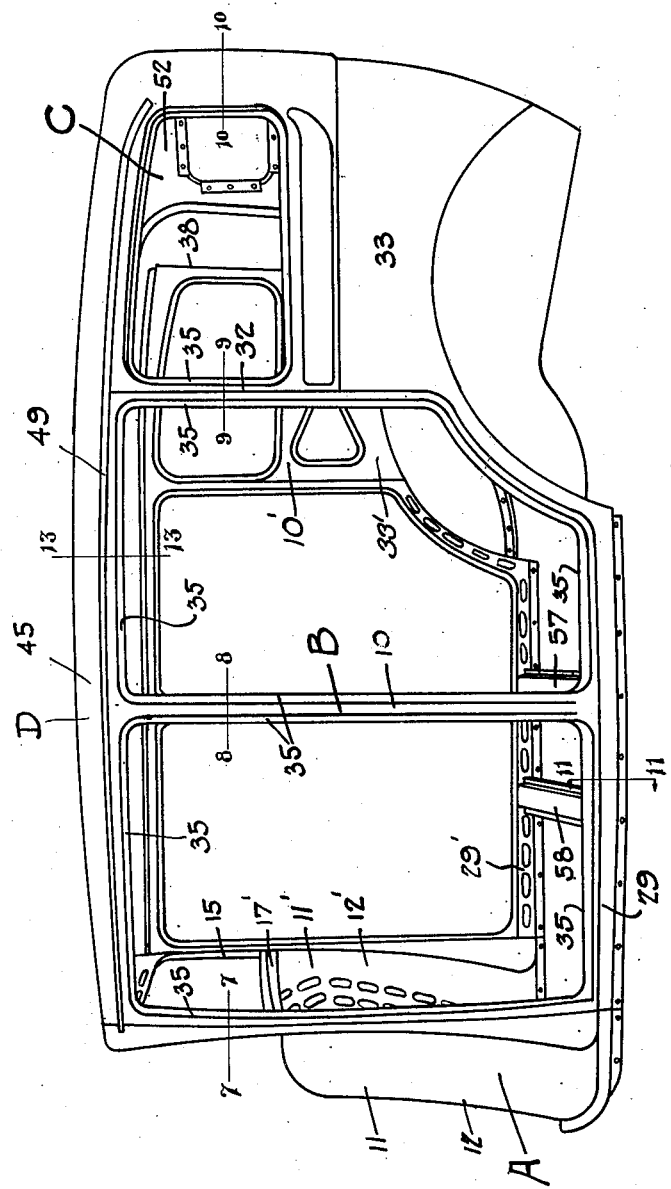

Figs. 7, 8 9 and 10 are detail sectional views taken respectively on the corresponding ly designated lines of Fig. 1.

Fig. 11 is a detail sectional view through the threshold structures of the body, as indicated by the lines 11—11 of Fig. 1, showing the manner of mounting on the chassis or underframe; the underframe sills and the connection thereto are indicated in dotted lines since these parts do not appear in Fig. 1.

Fig. 12 is an enlarged detail vertical sectional view through the top of the cowl and the lower windshield header.

Fig. 13 is a detail sectional view taken as indicated by the lines 13—13 of Fig. 1 through the side header or top rail and showing the joinder of the roof panel thereto.

The sedan type of body selected for illustration is divided, generally in a ma mer heretofore proposed, into a front unit A including the cowl portions of the A-posts and upper and lower windshield headers, the side units B extending from the A posts to and including the rear quarter, the rear unit C connecting the side units and a top unit D forming the roof and joined in its margins to the front, side and rear units.

The side and front units are comprised, as before proposed, of inner and outer unitary panels, which may be unitary outer and inner stampings 10 and 10' for the side units and corresponding outer and inner stampings 11 and 11' for the front unit, which stampings are joined together in the margins of the door and window openings and at points removed therefrom. These panels are, however, modified from prior constructions, particularly as regards the inner panels to enable the efficient joinder of the front and side units to each other in the final assembly solely by crimping operations, thereby avoiding all possibility of distortion or misalignment of the walls to destroy the very accurate dimensions given to the door and windshield openings by the large stampings extending entirely around said openings.

The structure by which this is attained will now be described in detail.

In the front unit construction the outer panel stamping 11 is made as heretofore proposed in one piece including the cowl 12, the front portion 13 of the A-posts including the rabbet 14 to receive the door overlap and at its other edge, in the upper portion thereof, the rabbet 15 to receive the windshield, and the outer portions 16 and 17, respectively, of the upper and lower windshield headers, each provided with a rabbet-forming with the rabbets 15 on the A-post portions 13, a continuous rabbet around the windshield opening curved on a generous curvature in the corners.

Figure 4:
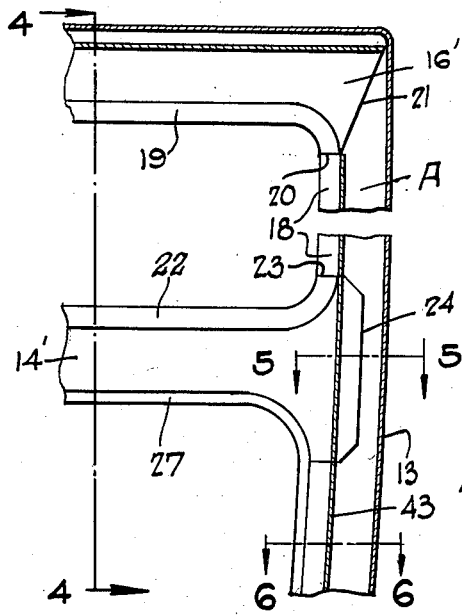
Fig. 4 is a fragmentary cross sectional view taken in a vertical plane through the front of the body showing the joinder of the inner side panel to the front unit of the body.
Figure 4:
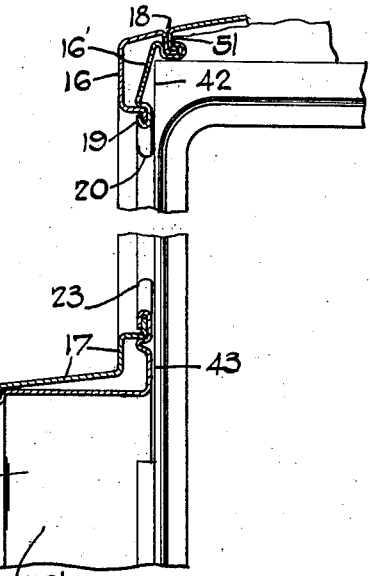
Figure 3:
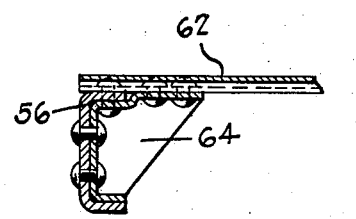
Fig. 3 is a detail cross sectional view taken on the line 3—3 of Fig. 2.

The inner paneling 11' for the front unit is, according to the form of the invention now best known to me, made into two separate stampings. One of these stampings 16' forming the inner panel of the upper header and joined to the upper and lower edges of the outer portion 16 of the header by crimping as at 18 and 19 respectively. The crimped edge 18 is offset downwardly to form on angular seat to receive the edge of a roof panel and the crimp is preferably left uncompleted until the final assembly as will presently appear. The crimped joinder at 19 is extended around the corners of the windshield to the point indicated at 20 in Figs. 4 and 6a. The side edges of the panel stamping 16' are left free. One such edge is indicated at 21, Fig. 6a.

The other of the inner panel stampings 12', 14' of the front unit comprises not only an inner complement 17' or the outer lower header portion 17 of the outer panel stamping 11 but also a forward extending portion 12' complemental to the cowl portion 12 of the outer stamping. The portion 17' is crimped in the lower edge of the windshield opening, as at 22, to the adjacent edge of the outer portion 17, this crimped joinder extending as described in connection with the upper headers, around the corner of the opening to a point indicated by numeral 23, Figs. 4 and 6a. The outer edges of the portion 17' are left free and extend into the hollow of the A-post structure, as indicated at 24, Figs. 5 and 6a. In the vertical side portions of the cowl the inner cowl panel portion 12' of the stamping 12', 17', terminates at the rear in a vertical edge 25 which is provided with a flange 26 forming a part of a final assembly joint with the inner panel of the side unit. In their front and lower margins the outer and inner cowl panel portions are joined by crimping, as shown at 27, Figs. 4 and 12. The crimped edge at the sides and top of cowl being inwardly offset to receive the rear edge of the hood (not shown).

The side units B comprise the inner and outer stampings 10 and 10' in which the outer stamping is formed substantially, except in the manner of its joinder to the roof, as heretofore proposed. It is comprised of a deep drawing including all the door and window openings in the side of the body and comprises the top header portion 28, the bottom threshold portion 29, the vertical post portions 30, 31 and 32 and the rear tonneau side portion 33. At the door and window openings it is flanged inwardly to form the jamb faces of the openings and then laterally to provide the overlap flanges generally designated by numeral 34. The inner panel 10' is a relatively flat stamping as heretofore, and is provided with portions 28', 29', 30', 31', 32' and 33' corresponding to the parts 28, 29, etc. of the outer panel, and is joined to the outer panel in the edges of the door openings, as heretofore proposed, by crimping its edges 35 adjacent the flanges 34 over said flanges. In their bottom edges 36 and 37, the outer and inner panels are similarly joined by crimping, as shown in Fig. 11.

The A-post portions 30 and 30' of the outer and inner panels are given a modified construction to adapt them for joinder to the front unit by crimping operations. The outer panel portion 30 is, as heretofore proposed, of substantially Z-section, the web of the Z forming the door overlap but the outer arm of the Z is formed into a portion 39 bent directly back upon itself which bears against the inner side of the door overlap flange 40 of the outer stamping 11 of the front unit and is secured thereagainst by crimping the edge 41 of the outer side stamping portion 30 over the outside of said flange 40. This joinder may be made by leaving suitable openings 41 in the inner stamping portion 30' through which a backing member may be inserted against the bent portion 39, or the post may be made of uniform curvature so that a continuous backing forming an inner support for the crimping operation may be inserted and removed from one of the ends thereof.

In the side of the windshield opening between the points 20 and 23 where the crimped joinder of the outer stamping 11 of the front unit with the inner header stampings 16' and 17' ends, the forward edge of the inner side stamping portion 30' is joined to the edge of the outer front post portion of the stamping 11, by crimping, as indicated in Fig. 7. In the regions of the transverse header inner panels 16' and 17' the inner side panel terminates in free edges 42 and 43, respectively, see Figs. 4 and 5, terminating just short of the panels 16' and 17'.

In its lower portion below the lower windshield header, the inner stamping 30' is joined by crimping, as at 44, Fig. 6, to the rear flanged edge 26 of the inner cowl panel portion 12'.

In this manner a very secure joinder is effected between the side and front units from which a strong A-post structure results, the joinder being effected entirely by crimping operations thereby insuring against any possibility of misalignment or distortion not infrequently caused by extensive welding operations, and also avoiding the necessity of forming holes in the parts to be joined and the troublesome aligning of those holes for the insertion of rivets or bolts where the parts are riveted or bolted together.

The joinder of the upper edges of the inner and outer side panels is combined in a novel manner with their joinder to the roof unit D which comprises in the present instance, a roof panel 45 having formed in its side edge the integral drip channel 46. To receive the channeled edge of the roof panel, the transversely extending top flange 47 of the header portion 28' of inner panel is provided with a channel shaped recess 48 along its outer edge, this channel shaped edge 48 resting within the angle 49 formed in the edge of the outer header panel, the extreme edge 50 of which is finally crimped over the outer walls of the edge channels 46 and 48 of the roof and inner panels to secure the parts together.

This provides a very efficient leak-proof roof joinder which can be effected by a single crimping operation, after the roof panel is placed in position, and the entire body is placed in a press provided with suitable crimping dies.

At the front the roof panel may be joined to the front unit by forming its edge with a rearwardly facing channel as 51, the lower side wall of which overlies the offset edge of the outer front header panel 16 and is secured thereto by the crimped over edge of the inner portion 16' of the front unit, as indicated at 18. At the rear the roof panel may be joined to the rear panel 52 by any suitable means, preferably by crimping. The joinder of the rear to the outer side panel 10 is effected by flanging the adjacent edges inwardly as at 53, 54. These flanges abut in their outer portions but diverge from each other inwardly and are securely locked together by crimping a metal strip 55 into the space between the diverging portions of the flanges and over the outer sides thereof as shown in Fig. 10. This forms a very secure crimped joinder of the parts.

Figure 2:
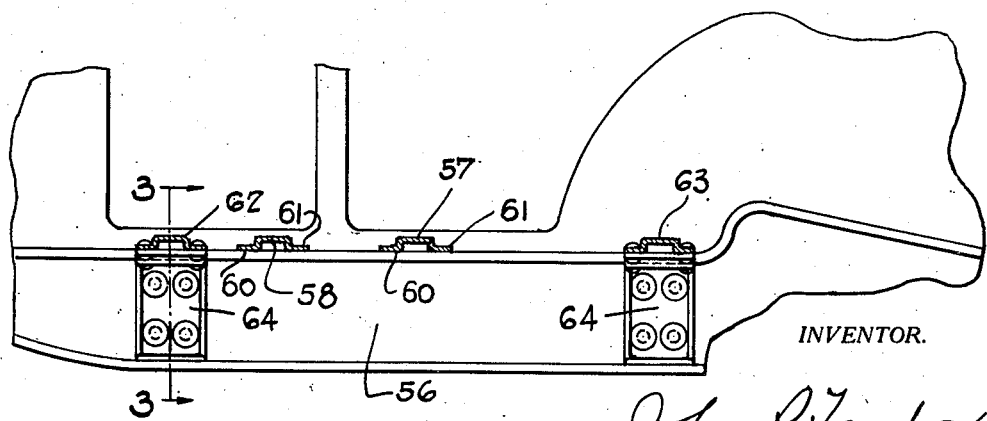
Fig. 2 represents more or less diagrammatically in longitudinal cross sectional view, the manner of mounting of the body on the chassis or underframe and an arrangement of certain of the body and chassis cross braces by which they combine to support flooring and seat structures directly from the chassis

The body superstructure so constructed and joined together is adapted to be joined to an underframe or chassis by having the vertical or substantially vertical inner sides of the threshold portions overlap the sides of the chassis or underframe sills, one of which is indicated in dotted lines at 56 in Fig. 11 and in full lines in Fig. 2. I prefer to support the floor boards and seat structures directly from the underframe or chassis, but my invention contemplates the incorporation of cross brace members on both body superstructure unit and on chassis unit prior to their assembly.

This insures a more rigid body superstructure since its lower portion is cross braced prior to assembly and it can be handled and shipped with less chance of possible injury, and at the same time, it affords a more convenient location of the body on the chassis in the final assembly and a means for more rigidly securing it in position, while at the same time permitting the entire weight borne by the flooring and seat structures to be taken directly by the chassis, providing a low center of gravity and easy riding qualities.

In the showing of Figs. 1 and 2, one form of the relative arrangement and spacing of body and chassis cross braces is disclosed, but this is a more or less diagrammatic showing and could readily be modified in various ways, the aim being to have the body and chassis cross braces supporting the flooring and seats interspersed so that they contribute to the common end of supporting the flooring and seats, and act commonly to cross brace the body and chassis so that the number of cross braces of the combined body and chassis may be substantially reduced, say, cut in half.

To this end, I have shown two cross braces 57 and 58 cross bracing the side threshold sections 29, 29' intermediate their ends. These cross braces may be, as shown, of inverted channel form having lateral flanges 60 and 61, respectively, extending from their side walls. The inner threshold panel portion 29' is provided with opening 62' through which the ends of the cross braces may extend into the hollow threshold to overlap the under side of the transverse threshold portion 29 of the outer panel, to which it is secured as by riveting or otherwise. At the opening a tab 63' is struck from the inner panel which may serve as a guide and support in inserting the cross brace and may be a further means of securing the cross brace to the threshold, if desired. When the body superstructure is placed down upon the chassis, the body cross braces 57 and 58 rest directly on top of the sills 56 and the body is secured to the chassis, in addition to the securing means heretofore proposed, among which is included that of riveting the lower crimped joint 36, 37 to the web of the sills 57, by riveting or bolting the cross brace flanges 60 and 61 to the channel sills 56.

In Fig. 2, I have shown additional cross braces 62 and 63 similar to the cross braces 57 and 58 having their ends resting directly on the top of the chassis side sills but terminating inside the outer vertical faces of said sills. These are preferably secured to the chassis by suitable brackets, as 64, which nest within the channels of the sills and are secured thereto as by riveting, and have portions underlying the cross braces and secured thereto, as by riveting, welding or otherwise.

By this construction it will be seen that I intersperse the cross braces originally assembled with the chassis and body, so that they combine in the final assembly, to support all the body flooring and seat structures, thus providing a construction which is as light and strong as structures heretofore proposed where the floor and seat supporting cross braces were all assembled with the chassis, and imparts the advantage of greater rigidity in the body unit prior to final assembly and further by the arrangement of the cross braces on top of the chassis sills permits the sides of the flooring to be supported directly on the tops of said sills, without the necessity of providing the top flanges of these sills with a rabbeted portion to receive the edges of the flooring, as heretofore proposed, and this without any substantial raising of the center of gravity of the body as a whole, over the prior constructions.

While I have hereinbefore described a specific embodiment of my invention, it will be understood that various changes and modifications may be made within the scope of my invention, and such changes are intended to come within the spirit and scope of the appended claims.

What I claim as new and useful is:

1. A vehicle body having hollow threshold portions comprised of inner and outer panels, and a body cross brace having its ends extended through openings in the inner panel of the threshold and secured to the outer panel.

2. A vehicle body having hollow threshold portions comprising inner and outer panels joined together in their edges and the outer panel having a transversely extending door jamb portion, a body cross brace having its end extended through the inner panel and overlapping the door jamb portion of the outer panel and secured thereto.

3. A vehicle body having threshold portions overlapping the sides of the chassis sills and secured thereto through said overlap, and cross braces secured to said threshold portions resting on and secured to the top of the chassis sills.

4. A vehicle construction, comprising a body superstructure including threshold portions connected by cross braces, a chassis frame having side sills upon which the body superstructure is adapted to be mounted and cross braces connecting said chassis sills, independent of the body superstructure cross braces, the tops of the chassis and body cross braces being arranged in substantially the same plane when the body superstructure is assembled with the chassis and in longitudinally spaced relation.

5. In a vehicle body construction, a hollow header comprised of inner and outer panels flanged upwardly in their outer margins with the flanges in abutting relation, a roof panel formed in its margin with an upwardly facing channel the outer wall of which overlaps the flanges of the outer and inner panels, said flanges being joined together by crimping the edge of the outer panel flange over the edges of the inner and roof panel flanges.

6. In a vehicle body construction, a header having a recess in its upper portion and a flange projecting upwardly on the outer side of said recess, a roof panel having a drip channel formed in its edge and seated in said recess, and secured in place by crimping the flange on the header to the edge of the drip channel.

7. A front unit for vehicle bodies, comprising inner and outer stampings forming the sides and top of the cowl, the lower windshield header and portions of the A posts, said stampings being joined along the forward edge of the cowl, and in the lower margin of the windshield, but formed with free edges in their rear vertical side portions, said edges forming final assembly joints for connection with an adjoining unit.

8. A vehicle body comprising front and side units joined substantially in the plane of the front posts and each comprised of inner and outer panels, the forward vertical edge of the side unit being joined in final assembly to the edge of the outer front panel in the margin of the windshield opening and to the front inner panel in the region below the lower windshield header, but unconnected to the front unit in the region of the upper and lower windshield header.

9. In a vehicle body construction an upper windshield header comprising inner and outer panels, the inner panel having its opposite edges formed into channels lying in opposed planes, the outer panel having its opposite edges flanged in opposed planes so as to lie within said channels, and the walls of said channels being crimped over said flanges for securing the panels together.

10. In a vehicle body construction an upper windshield header and roof panel assembly comprising inner and outer panels forming the header, the inner panel being provided with a channel and the outer panel and the roof panel having contacting flanges arranged and held in said channel by crimping the walls thereof.

In testimony whereof he hereunto affixes his signature.

JOHN P. TARBOX.